United States Patent [19]
Espenschied et al.

[11] 4,200,007
[45] Apr. 29, 1980

[54] APPARATUS FOR SYNCHRONIZING THE DRIVING AND DRIVEN MEMBERS DURING GEAR SHIFT OPERATIONS

[75] Inventors: Helmut Espenschied; Uwe Kiencke, both of Ludwigsburg; Alfred Schulz, Oberriexingen, all of Fed. Rep. of Germany

[73] Assignee: Robert Bosch GmbH, Stuttgart, Fed. Rep. of Germany

[21] Appl. No.: 932,171

[22] Filed: Aug. 9, 1978

[30] Foreign Application Priority Data

Sep. 19, 1977 [DE] Fed. Rep. of Germany ....... 2742033

[51] Int. Cl.² .............................................. B60K 41/08
[52] U.S. Cl. ................................ 74/859; 123/32 EH; 123/32 EL; 74/872
[58] Field of Search ................. 74/858, 857, 859, 860, 74/866; 123/32 EH, 32 EL

[56] References Cited

U.S. PATENT DOCUMENTS

| | | | |
|---|---|---|---|
| 2,699,686 | 1/1955 | Thomas | 74/858 |
| 3,817,121 | 6/1974 | Mullen | 74/858 X |
| 4,082,013 | 4/1978 | Dornfeld et al. | 74/859 X |
| 4,112,879 | 9/1978 | Assenheimer et al. | 123/32 EH |

FOREIGN PATENT DOCUMENTS

2452808  5/1976  Fed. Rep. of Germany ...... 123/32 EL
1466867  3/1977  United Kingdom ...................... 74/858

*Primary Examiner*—H. Hampton Hunter
*Attorney, Agent, or Firm*—Frishauf, Holtz, Goodman & Woodward

[57] ABSTRACT

During gear shift, the fuel control for the engine is switched from the gas pedal to a regulator which regulates it such that the speed of the engine is changed from the speed corresponding to the then-present gear to the speed for the next subsequent gear at a predetermined rate of change of speed with respect to time. A different rate of change of speed may be provided for upshift and downshift operations. A comparator compares the engine speed to the output speed of the gearing and furnishes a shift terminate signal signifying synchronism between the two speeds when the two speeds have a predetermined relationship. A first and second offset signal may be applied to the comparator to allow the engine speed to be somewhat less than the output speed of the gear, and vice a versa, during downshift and upshift respectively.

8 Claims, 4 Drawing Figures

APPARATUS FOR SYNCHRONIZING THE DRIVING AND DRIVEN MEMBERS DURING GEAR SHIFT OPERATIONS

The present invention relates to systems for establishing synchronism between the driving and the driven member during gear shift operations.

BACKGROUND AND PRIOR ART

In order to prevent damage to the gears, it is necessary to synchronize the driving and driven members when shifting from one gear to the next. In motor vehicles in which such synchronization is not carried out automatically, the driver must, by suitable control of the gas pedal reduce the speed of the engine when shifting from a lower gear to a higher gear and must increase the speed of the engine when shifting from a higher to a lower gear. This control requires a certain amount of skill on the part of the driver and tends to distract his attention from the traffic conditions. Therefore a number of mechanical synchronization systems have been proposed which operate without intervention of the driver. However, such mechanical arrangements cannot be incorporated into all vehicles. For example in heavy duty trucks it is almost impossible to incorporate such arrangements, in particular with respect to the lower gears.

An electro-mechanical system is known from DT-OS No. 1,655,210 in which the engine is automatically braked when a gear shift from a lower to a higher gear takes place. British Pat. No. 1,466,867 discloses the system in which a fuel injection pump is controlled during gear shift operations.

THE INVENTION

In the present invention, energy supply means, for example an injection pump, are furnished for supplying energy to the engine. The energy supply means operate in response to an energy control signal. During gear shift a switch switches the control input of the energy supply means to regulator means which furnish the energy control signal to the energy supply means such that the speed is regulated from the then-present speed to the desired engine speed corresponding to the next subsequent gear at a predetermined rate of speed change with respect to time. The predetermined rate of speed change can be different for upshift and downshift operations. Further, speed responsive means are provided which furnish a shift terminate signal when the desired relationship between the engine speed and the output speed of the gearing has been achieved. In a preferred embodiment the speed responsive means comprises two comparators which allow offsets to be introduced between the engine speed and the output speed of the gearing, such that the engine speed can exceed the speed of the gearing by a predetermined amount when completing an upshift and can be less than the output speed of the gearing by a predetermined amount when completing a downshaft operation.

DRAWINGS ILLUSTRATING A PREFERRED EMBODIMENT

Figure 1:
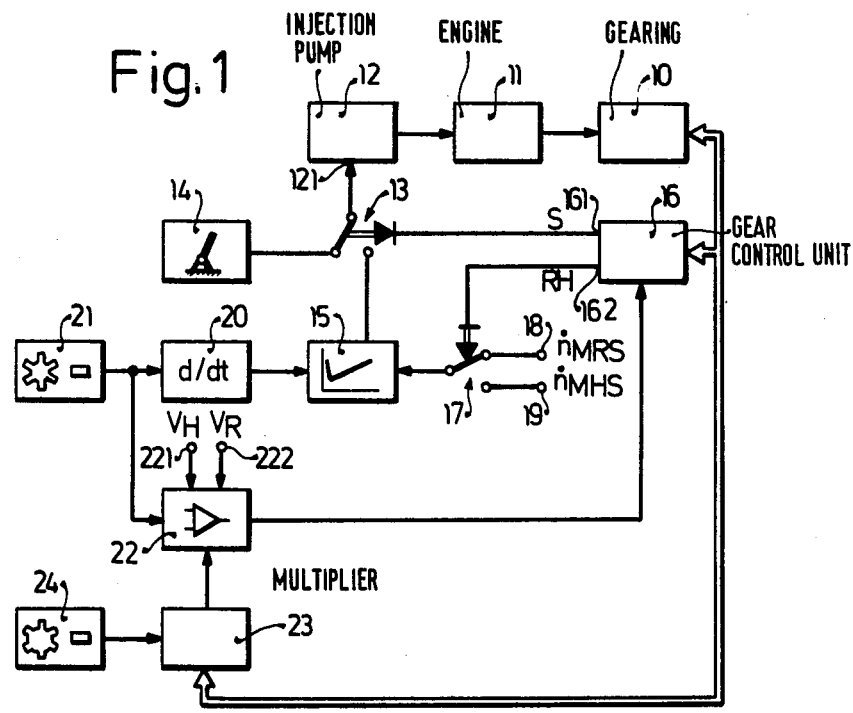
FIG. 1 is a block diagram of the system of the present invention.

In the block diagram of FIG. 1, gearing 10 is driven by an engine 11. Energy is supplied to the engine on a metered basis by an energy supply 12 which is, for example, an injection pump. The metered amount of fuel injected by the injection pump varies as a function of an energy control signal applied at a control input of the pump. This control input is denoted by reference numeral 121 and is connected to the fixed terminal of a selector switch 13. Under normal operation conditions, switch 13 connects terminal 121 to the gas pedal 14. In a second position of selector switch 13, terminal 121 is connected to the output of a regulator 15. The position of selector switch 13 is controlled by a signal at output terminal 161 of a gear control unit 16. A "1" signal at terminal 161 signifies that a shift operation is to be initiated. Gear control unit 16 has a further output 162. A "1" output at terminal 162 indicates that an upshift is to take place. A "0" output at terminal 162 indicates that a downshift is to take place. Terminal 162 is connected to the control input of a second switch 17. Either a terminal 18 or a terminal 19 can be connected to regulator 15 under control of switch 17. Further, the output of a differentiating stage 20 is connected to another input of regulator 15. The input of differentiating stage 20 receives a signal from an engine speed sensor 21. Engine speed sensor 21 is also connected to one input of a comparator 22. A second input of comparator 22 receives the output signal from a weighting stage 23 whose input is connected to the output of a gear speed sensor 24 which senses the output speed of the gearing and furnishes an electrical signal corresponding thereto. Offset inputs $V_H$ and $V_R$, which will be discussed in greater detail below, may be applied to comparator 22 at terminals 221 and 222 respectively. Gear control stage 16 and gearing 10 interact as indicated by the double lines. Information as to the gear ratio is transferred from gearing 10 to weighting stage 23. The output of comparator 22 is connected to gear control unit 16.

In a preferred embodiment the drive for a motor vehicle consists of motor 11, gearing 10 and the energy supply 12. The system of the present invention is, however, not to be limited to this type of drive since it can equally well cooperate with electrical drives, gas turbines, etc. Under normal operating conditions, as mentioned above, the energy supply is controlled by energy control signal furnishing means as, for example, the gas pedal of the automobile. Gear control unit 16 can be a fully automatic electronic gear control unit, a manual gear shift or a semi-automatic gear shift. Signals can be derived from any of these gear control systems which signify that a gear shift is to be carried out and which signify whether the shift is to be an upshift or a downshift. As mentioned above these signals are supplied at terminals 161 and 162 of gear control unit 16. Thus if an upshift is to occur both terminals 161 and 162 will carry a logic "1" signal. These are denoted by S and RH in FIG. 1 respectively. If a downshift is to take place, terminal 161 carries a logic "1" signal and the signal at terminal 162 is a logic "0". In response to a "1" signal at terminal 161, switch 13 is switched to the position wherein terminal 121 is connected to the output of regulator 15. One input to regulator 15 is the first derivative with respect to time of engine speed. This is furnished by differentiating stage 20. A further input to regulator 15 is a signal signifying the desired rate of engine speed change during upshift or during downshift as furnished, respectively, at terminals 18 and 19. For a downshift operation, the reference input to regulator 15 would be the signal at terminal 18. The position of selector switch 17 shown in FIG. 1 is thus the position under downshift conditions, that is when the signal at terminal 162 is a "0" signal. For downshift operation, the desired rate signal is a positive signal while for an upshift operation the desired rate of change of engine speed is negative. The same rate of change of engine speed may be used for all possible upshifts and for all possible downshifts or, alternatively, the desired rate of change of engine speed may be different for different gears. Also, the then-present operating parameters of the engine or of the vehicle driven by the engine may be taken into consideration in determining the reference signal applied to terminals 18 and 19.

The output of regulator 15, under control of the above described inputs, causes the energy supply 12 to vary the amount of fuel supplied to engine 11 such that the rate of change of engine speed with respect to time corresponds to the desired rate of change of speed. Simultaneous, the actual engine speed is compared to the output speed of the gearing after suitable weighting in stage 23. When the two inputs to comparator 22 have reached a predetermined relationship the required synchronization between the driving and the driven members has been achieved and a signal signifying this synchronization is applied to gear control unit 16. The signal at the output of gear speed sensor 24 is multiplied in stage 23 by a multiplication factor corresponding to the gear ratio, so that the comparison in comparator 22 can be carried out to a zero difference. As will be described in greater detail below, this zero difference may be modified by an offset in accordance with signals supplied at terminals 221 and 222. Specifically a voltage applied at terminal 222 controls the offset for a downshift, a voltage at terminal 221 controls that for an upshift. An output signal from comparator 22, which signifies that the required predetermined relationship between engine speed and gear speed has been achieved causes the "1" signal at terminal 161 of gear control unit 16 to be changed to a "0" signal, thereby causing selector switch 13 to return to its previous condition connecting gas pedal 14 to terminal 121 of injection pump 12. Simultaneously the gear shift process in gearing 10 is completed. The system is then again in its normal operating condition.

Figure 2:
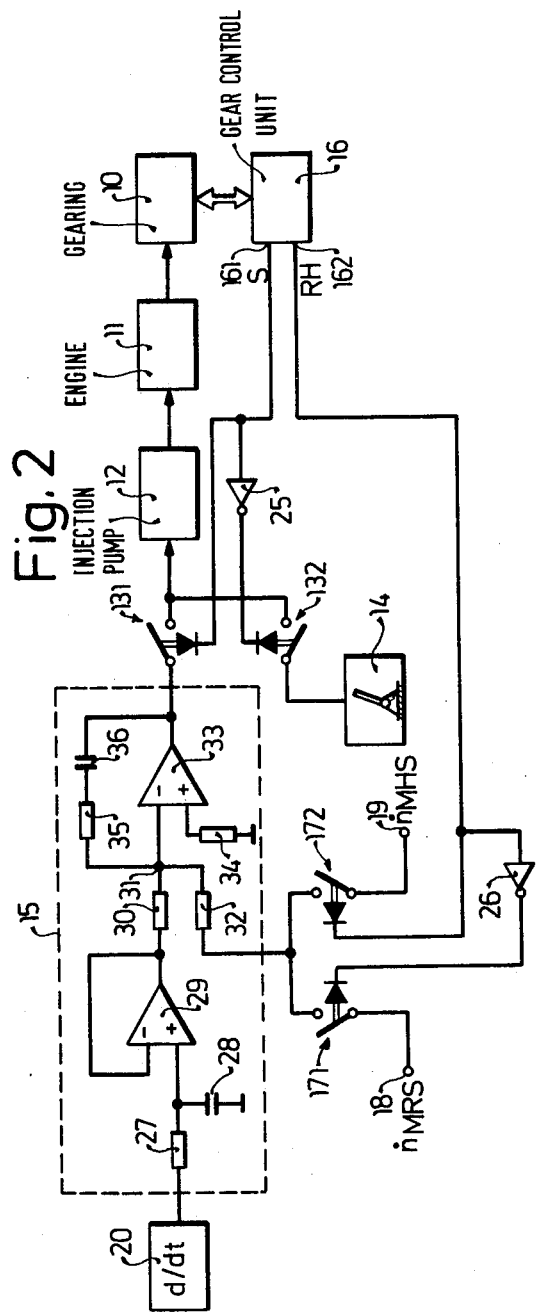
FIG. 2 is a circuit diagram of the regulator of FIG. 1 and its interconnection to the remainder of the system.

Regulator 15 is shown in greater detail in FIG. 2. Fig. 2 is a circuit diagram of regulator 15 and its connection to the remainder of the system. Regulator 15 has one input connected to the output of differentiating stage 20 and a further input connected to contacts 171, 172 of selector switch 17. The output of regulator 15 is connected through a contact 131 of switch 13 to the input of the energy supply 12. Contact 131 is controlled by the signal at terminal 161 of gear control unit 16. The same signal, through an inverter 25, controls contact 132 which connects gas pedal 14 to the input of energy supply 12. The upshift/downshift control signal at terminal 162 of gear control unit 16 is applied directly to control the position of contact 172 and, through an inverter 26, controls the switching state of contact 171 of selector switch 17. Contact 172, when closed, connects the input of regulator 15 to terminal 19 at which, as mentioned above, a signal corresponding to the desired rate of change of engine speed during an upshift operation is supplied. Contact 171 when closed connects terminal 18 which carries a corresponding signal for the downshift operation to the input or regulator 15.

In the preferred embodiment regulator 15 is constructed as follows: the input connected to the output of differentiating stage 20 is connected through an RC member including a resistor 27 and a capacitor 28 to the direct input of an operational amplifier 29. The output of operational amplifier 29 is directly connected to its inverting input. It is further connected through a resistor 30 to a summing point 31. Summing point 31 is connected to the second input of regulator 15 through a resistor 32. It is further directly connected to the inverting input of an operational amplifier 33 whose non-inverting input is connected through a resistor 34 to a reference potential, for example chassis. A feedback circuit for operational amplifier 33 includes a resistor 35 and a capacitor 36. The output of operational amplifier 33 constitutes the output of regulator 15 which is connected to contact 131 of selector switch 13.

OPERATION

Under normal operating conditions contact 132 is closed and contact 131 is open. The supply of energy to the engine is thus controlled by stage 14. If now a "1" signal appears at terminal 161 of gear control unit 16 signifying that a gear shift is to be initiated, contact 131 is closed and contact 132 is opened. The energy supply 12 is now connected to the output of regulator 15. If the shift to be carried out is an upshift, a "1" signal is also present at terminal 162. Contact 172 is closed, while contact 171 is opened. If the shift is a downshift, terminal 162 carries a "0" signal and contact 172 is opened while contact 171 is closed. The signal furnished by engine speed sensor 21 is differentiated with respect to time in differentiating stage 20. In a preferred embodiment the differentiating stage is a phase regulator circuit. Such a phase regulator circuit furnishes a voltage which is proportional to engine speed and a pulse sequence whose average value is proportional to the change in motor speed. Subsequent smoothing of the output voltage of differentiating stage 20 in RC circuit 27, 28, causes the voltage applied to the direct input of operational amplifier 29 to be proportional to the first derivative with respect to time of engine speed. This signal is applied to summing point 31 at which point it is compared to the reference signal signifying the desired rate of change with respect to time applied at the other input of regulator 15. The signal at either terminal 18 or terminal 19 is selected under control of the signal at terminal 162 as was described above. The difference between the actual rate of change and the desired rate is applied to the inverting input of operational amplifier 33. Operational amplifier 33 acts as a PI regulator. The output of regulator 15 is then applied through contact 131 to energy supply 12. Only after the gear shift has been completed is the signal at terminal 161 of gear control unit 16 change to a "0" signal which causes the input of stage 12 to be reconnected to stage 14.

Figure 3:
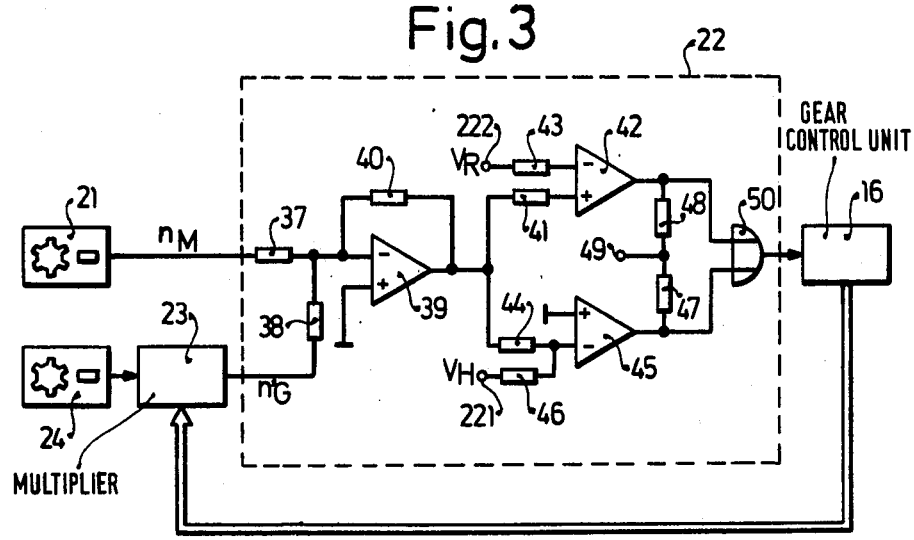
FIG. 3 is a circuit diagram of the comparator of FIG. 1 and its interconnection in the system.

FIG. 3 shows the comparator 22 of FIG. 1. The first input of comparator 21 is connected to the output of speed sensor 21, its second input is connected through stage 23 to the output of speed sensor 24. The output of comparator 22 is applied to gear control unit 16.

Comparator 22 is constructed as follows: the first and second inputs to the comparator are connected through resistors 37 and 38 respectively to the inverting input of an operational amplifier 39. The direct input of operational amplifier 39 is connected to reference potential, while its output is connected through a resistor 40 to its inverting input. The output of operational amplifier 39 is connected through a resistor 41 to the direct input of a comparator 42 and through a resistor 44 to the inverting input of a comparator 45. The inverting input of comparator 42 is connected through a resistor 43 to a terminal 222. The direct input of comparator 45 is connected to reference potential. Its inverting input is connected through a resistor 46 to a terminal 221. The output of comparator 45 is connected through a resistor 47 to a terminal 49. Terminal 49 is connected to the output of comparator 42 through a resistor 48. An OR gate 50 has a first input connected to the output of comparator 42 and a second input connected to the output of comparator 45. The output of OR gate 50 constitutes the output of comparator 22. Comparator 22 as shown in FIG. 3 operates with offsets, the offset for a downshift operation being applied to comparator 42 at terminal 222, that for an upshift operation to comparator 45 at terminal 221.

OPERATION

Figure 4:
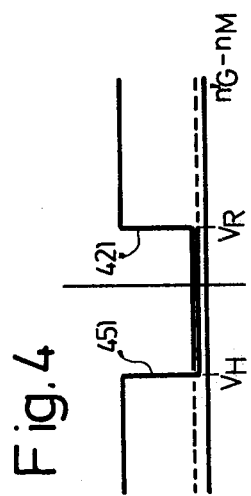
FIG. 4 is a switching diagram showing offsets in the synchronization point for upshift and downshift operations.

The switching characteristic of comparators 42, 45 is shown in FIG. 4. Operational amplifier 39 operates as a proportional amplifier and furnishes a voltage at its output which is proportional to the difference between the gearing output speed $n'_G$ and the engine speed $n_M$. This voltage is applied to comparators 42 and 45. If this voltage exceeds the offset voltage applied at terminal 222, the output of comparator 42 is a "1" signal. If it is smaller, its output is a "0" signal. This is shown as curve 421 in FIG. 4. If the output voltage of operational amplifier 39 is more negative than the offset voltage applied at terminal 221, the output of comparator 45 is a logic "1" signal; if it is more positive, the output is a "0". This yields curve 451 of FIG. 4. If the outputs of comparators 42 and 45 are then applied to the inputs of OR gate 50, the output of OR gate 50 will be a "0" if the difference between the gearing output speed and the engine speed lies within the prescribed offset limits. If the difference exceeds the offset limit in either direction, the output of OR gate 50 will be a "1" signal. The "0" signal at the output of OR gate 50 thus constitutes the signal which causes gear control unit 16 to complete the shift operation. A voltage may be applied to terminal 49 to cause the outputs of the comparators to be more symmetrical. Causing the gearing to be engaged with the above described offsets rather than at the exact sychronized point has the advantage that the engagement takes place with a lower load and is thus smoother. Typical offsets values are the following:

$V_h = 100$ mV $V_r = 200$ mV

Various changes and modifications may be made within the scope of the inventive concept.

We claim:

1. In drive apparatus having gearing (10) having a plurality of gear ratios, an engine (11) for driving said gearing, energy supply means (12) connected to said engine for supplying energy thereto in accordance with an energy control signal, externally operable energy control signal furnishing means (14) for furnishing said energy control signal to said energy supply means, and gear control means (16) for furnishing a shift initiate signal for initiating a gear shift under predetermined operating conditions, a system for synchronizing said engine to said gearing during a so-initiated gear shift from a present gear to a next subsequent gear, comprising regulator means (15) for furnishing an energy control signal adapted to change the speed of said engine from a present speed corresponding to said present gear to a desired speed corresponding to said next subsequent gear;

and switch means (13) connected between said energy control signal furnishing means, said regulator means and said energy supply means, for disconnecting said energy supply means from said energy control signal furnishing means and connecting said energy supply means to said regulator means during said so-initiated gear shift.

2. Apparatus as set forth in claim 1, wherein said regulator means comprises means for changing said speed of said engine from said present speed to said desired speed at a predetermined rate of change of speed with respect to time.

3. Apparatus as set forth in claim 2, wherein said regulator means comprises means for changing said speed of said engine from said present speed to said desired speed at a first and second predetermined rate of change of speed with respect to time during an upshift and a downshift respectively.

4. Apparatus as set forth in claim 3, further comprising speed responsive means (22) for furnishing a shift terminate signal when said speed of said engine has reached said desired speed;

and wherein said gear control means has a shift initiate output for furnishing said shift initiate signal, a shift direction output (162) for furnishing a shift direction signal indicative of the desired shift direction and a shift terminate input connected to said speed responsive means for receiving said shift terminate signal.

5. Apparatus as set forth in claim 4, further comprising first speed sensor means (21) for sensing the speed of said engine and furnishing a first speed signal indicative thereof, and second speed sensor means for sensing the output speed of said gearing and furnishing a second speed signal indicative thereof;

and wherein said speed responsive means comprises comparator means having a comparator output for furnishing said shift terminate signal and a first and second comparator input;

further comprising means (37) for connecting said first speed sensor means to said first comparator input and second connecting means (38, 23) for connecting said second speed sensor means to said second comparator input.

6. Apparatus as set forth in claim 5, wherein said second connecting means comprises a weighting stage for multiplying said second speed signal by a factor corresponding to the ratio between said desired speed of said engine and said output speed of said gearing.

7. Apparatus as set forth in claim 5, wherein said comparator means comprises a first operational amplifier (39) having an inverting input for receiving said first and second speed signal, a direct input for receiving a reference signal and a first operational amplifier output for furnishing a difference signal corresponding to the difference between said first and second speed signals, for furnishing said shift terminate signal when said output speed of said gearing exceeds said engine speed by a predetermined first offset speed difference during a downshift and when said output speed of said gearing is less than said engine speed by a predetermined second offset speed during an upshift.

8. Apparatus as set forth in claim 7, wherein said additional operational amplifier means comprise a first and second difference amplifier (42, 45) having, respectively, a first and second reference input for receiving a first and second offset reference signal (222, 221) signifying, respectively, said first and second offset speed difference, and a first and second difference amplifier output, means for connecting said first operational amplifier output to said first and second difference amplifier, an OR gate having a first and second input and an output for furnishing said shift terminate signal, and means for connecting said first and second difference amplifier output to said first and second input of said OR gate respectively.

* * * * *